United States Patent
Nakata

(10) Patent No.: US 8,385,837 B2
(45) Date of Patent: Feb. 26, 2013

(54) MOBILE RECEIVER APPARATUS

(75) Inventor: Kazuhiro Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 12 days.

(21) Appl. No.: 13/264,071

(22) PCT Filed: Jul. 15, 2009

(86) PCT No.: PCT/JP2009/003333
§ 371 (c)(1),
(2), (4) Date: Oct. 12, 2011

(87) PCT Pub. No.: WO2011/007389
PCT Pub. Date: Jan. 20, 2011

(65) Prior Publication Data
US 2012/0028593 A1    Feb. 2, 2012

(51) Int. Cl.
*H04B 17/00* (2006.01)
*G01P 11/00* (2006.01)

(52) U.S. Cl. .................. 455/67.16; 455/238.1; 702/96; 702/142

(58) Field of Classification Search ............... 455/238.1, 455/150.1, 193.1, 67.11, 67.16, 226.1, 65, 455/506; 702/96, 142, 149; 340/917
See application file for complete search history.

(56) References Cited

U.S. PATENT DOCUMENTS

| | | | |
|---|---|---|---|
| 7,426,450 B2 * | 9/2008 | Arnold et al. ................. | 702/142 |
| 7,751,369 B2 * | 7/2010 | Kishigami et al. ............ | 370/334 |
| 7,860,051 B2 * | 12/2010 | Kishigami et al. ............ | 370/328 |
| 8,112,780 B2 * | 2/2012 | Taura et al. ..................... | 725/75 |

FOREIGN PATENT DOCUMENTS

| | | |
|---|---|---|
| EP | 0 987 887 A2 | 3/2000 |
| JP | 7-336628 A | 12/1995 |
| JP | 2001-028561 A | 1/2001 |
| JP | 2002-530005 A | 9/2002 |
| JP | 2002-299960 A | 10/2002 |
| WO | WO 00/28679 A1 | 5/2000 |

* cited by examiner

*Primary Examiner* — Sonny Trinh
(74) *Attorney, Agent, or Firm* — Birch, Stewart, Kolasch & Birch, LLP

(57) ABSTRACT

A mobile receiver apparatus includes first tuner 2 for converting a received frequency signal by antenna 1 into an intermediate frequency signal, delay circuit 4 for setting a time required for the movement corresponding to a specific wavelength of the received frequency signal as a delay time, second tuner 3 for converting an output of the circuit 4 into a second intermediate frequency signal, and control units 5A and 7A for dynamically setting the delay time in the circuit 4 in response to a measured movement speed of a mobile unit and a received electric field strength upon the measurement, and equiphase-combining the intermediate frequency signals generated by the tuners 2 and 3 to be outputted, and the unit 7A sets the delay time corresponding to a received frequency and a Doppler shift frequency in the circuit 4, and equiphase-combines signals having a phase difference of about ¼ wavelength (90°).

4 Claims, 6 Drawing Sheets

MOBILE RECEIVER APPARATUS

TECHNICAL FIELD

The present invention relates to a mobile receiver apparatus suitably used particularly in a vehicle in which a broadcast reception wave received via an antenna momentarily changes due to an influence of a multipath or the like.

BACKGROUND ART

According to a technique disclosed in Patent Document 1, the following method is proposed: a delay circuit having a delay which is negligible for a desired signal but not negligible for a noise component is provided in an intermediate frequency circuit of a radio, an SN ratio is improved by combination, and sensitivity is thereby enhanced.

PRIOR ART DOCUMENTS

Patent Documents

Patent Document 1: Japanese Patent Application Laid-open No. H07-336628

However, according to the technique disclosed in Patent Document 1, only a simple addition of a delayed intermediate frequency signal (hereinafter simply referred to as an IF signal) and an undelayed IF signal is carried out; it is not possible to desire an improvement in dynamic reception performance under the influence of a multipath or the like in which a reception environment momentarily changes with movement.

In addition, although there exists what is called a diversity technique in which antennas are laid out away from each other by a specific distance and equiphase combination is performed using outputs thereof, the technique requires two sets of antenna systems, and the technique therefor requires high cost.

The present invention is made to solve the foregoing problems, and an object of the invention is to obtain a mobile receiver apparatus that realizes an improvement in dynamic reception performance at low cost.

SUMMARY OF THE INVENTION

A mobile receiver apparatus according to the present invention includes a first tuner for converting a received frequency signal received by an antenna into an intermediate frequency signal, a delay circuit for setting a time required for the movement corresponding to a specific wavelength of the received frequency signal as a delay time, a second tuner for converting an output of the delay circuit into a second intermediate frequency signal, and a control unit for dynamically setting the delay time in the delay circuit in response to a movement speed of a mobile unit to be measured and a received electric field strength upon the measurement, and also equiphase-combining the intermediate frequency signals generated by the first and second tuners and outputting the resultant signal.

Further, the mobile receiver apparatus mounted on a mobile unit of the invention includes: a first tuner for converting a received frequency signal received by an antenna into a first intermediate frequency signal; a first multiplier for multiplying the first intermediate frequency signal in a range in which a modulation band is securable; a second tuner for converting a received frequency signal received by an antenna into a second intermediate frequency signal; a second multiplier for multiplying the second intermediate frequency signal in a range in which a modulation band is securable; a delay circuit for setting, as a delay time, a time obtained by dividing a time required for the movement of the mobile unit corresponding to a specific wavelength of the received frequency by a multiplication ratio in which a modulation band is securable, based on the output of the second multiplier; a control unit for equiphase-combining the signal delayed by the delay circuit and the output of the first multiplier, and outputting the resultant signal.

According to the invention, the received frequency signal via the delay circuit and the undelayed received frequency signal are individually inputted to the first and second tuners and the intermediate frequency signals obtained by the conversion in the individual tuners are equiphase-combined by the control unit; thus, there is an advantageous effect such that an improvement in dynamic reception performance can be achieved with a low-cost composition without requiring the diversity technique.

BEST MODE FOR CARRYING OUT THE INVENTION

A description is given hereinbelow of modes for carrying out the invention with reference to the accompanying drawings in order to describe the present invention in more detail.

Embodiment 1

Figure 1:
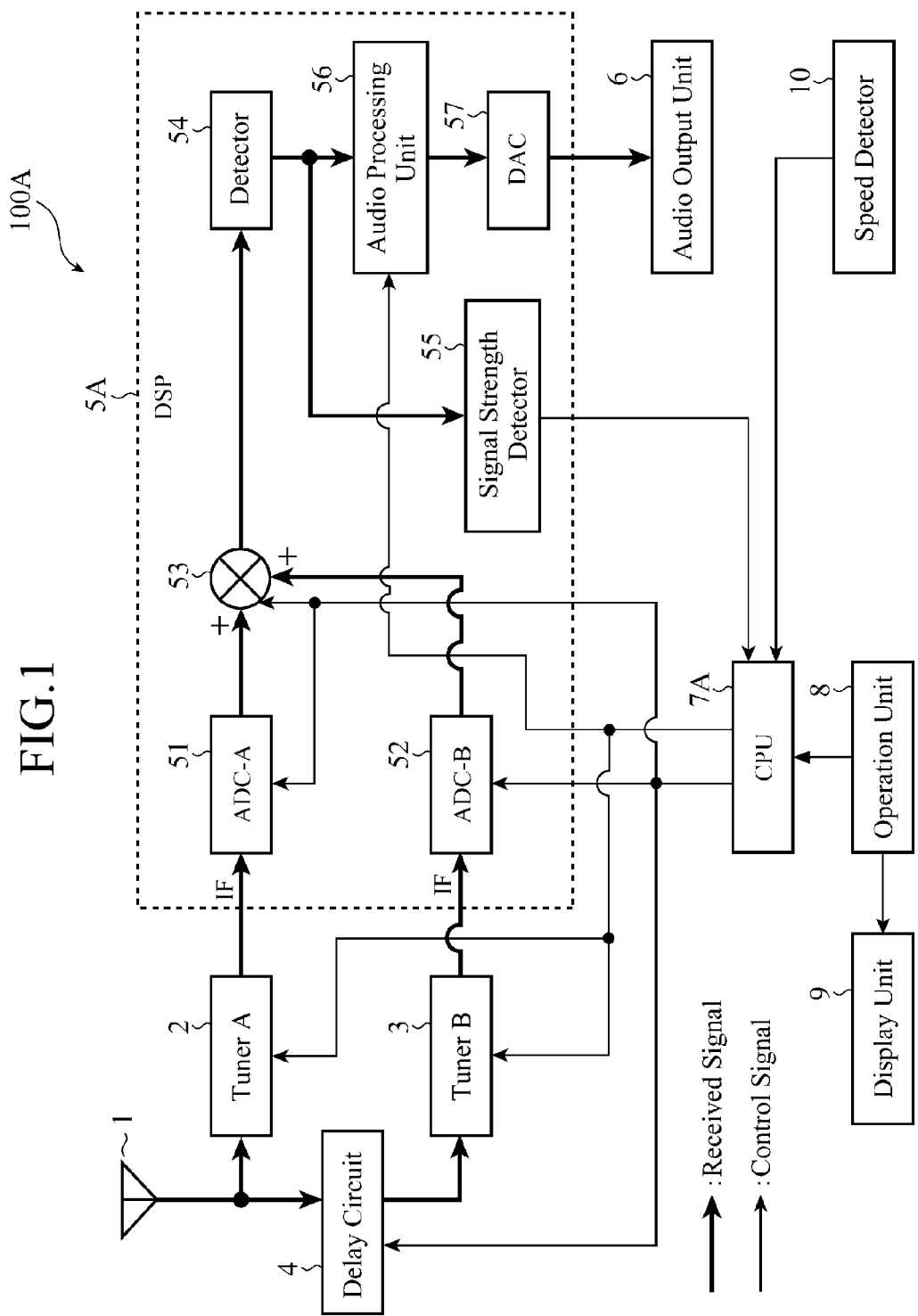
FIG. 1 is a block diagram showing an internal composition of a mobile receiver apparatus according to Embodiment 1 in the present invention.

FIG. 1 is a block diagram showing an internal composition of a mobile receiver apparatus 100A according to Embodiment 1 in the invention in which a radio receiver mounted on a vehicle is shown as a mobile unit by way of example.

As shown in FIG. 1, the mobile receiver apparatus 100A according to Embodiment 1 in the invention is composed of a single antenna 1, two systems of tuners A (2) and B (3), a delay circuit 4, a DSP (Digital Signal Processing apparatus 5A), an audio output unit 6, a CPU (Central Processing Unit 7A), an operation unit 8, a display unit 9, and a speed detector 10.

Note that in FIG. 1, an arrow in a thick solid line indicates a received signal, while an arrow in a thin solid line indicates a control signal by the DSP 5A or the CPU 7A.

In the above composition, the antenna 1 receives a broadcast reception wave, and inputs an RF signal to the tuner A (2) and the delay circuit 4. The tuner A (2) converts the inputted RF signal into an IF signal and outputs the IF signal to the DSP 5A, while the delay circuit 4 converts the RF signal which is delayed by a delay time set by the CPU 7A (described later) into an IF signal and outputs the IF signal to the DSP 5A.

The DSP 5A, as its internal composition is shown with developed functionally, includes two systems of analog-digital converters (hereinafter referred to as an ADC-A (51) and an ADC-B (52)), an equiphase combiner 53, a detector 54, a signal strength detector 55, an audio processing unit 56, and a digital-analog converter (hereinafter referred to as a DAC 57).

The ADC-A (51) obtains the input of the IF signal from the tuner A (2), converts the IF signal into a digital signal in accordance with a sampling period under the control by the CPU 7A, and outputs the digital signal to the equiphase combiner 53. The ADC-B (52) obtains the input of the IF signal from the tuner B (3), converts the IF signal into a digital signal under the control by the CPU 7A, and outputs the digital signal to the equiphase combiner 53. The equiphase combiner 53 combines the digital IF signals as the outputs of the ADC-A (51) and the ADC-B (52) by phasing under the control of the CPU 7A, and outputs the resultant signal to the detector 54. In general, when two waves having a phase difference of the order of ¼ wavelength (90°) therebetween are combined in the equiphase combiner, an effect as a diversity antenna becomes noticeable.

The detector 54 detects the output of the equiphase combiner 53, and outputs the resultant signal to the signal strength detector 55 and the audio processing unit 56.

The signal strength detector 55 detects a received electric field strength (RSSI: Received Signal Strength Indicator) from the output of the detector 54, and outputs the RSSI to the CPU 7A. The audio processing unit 56 extracts an audio signal component from the IF signal, and supplies the extracted audio signal component to the audio output unit 6 composed of a speaker and the like via the DAC 57. The audio processing unit 56 also performs the adjustment of a volume, tone control, and the like in accordance with a user operation of the operation unit 8.

The CPU 7A operates in cooperation with the DSP 5A to thereby function as control units for dynamically setting the delay time in the delay circuit 4 in response to the movement speed of the mobile unit to be measured by the speed detector 10 and the RSSI at the time of the measurement, and also equiphase-combining the IF signals generated by the tuners A (2) and B (3) and outputting the resultant signal. The details thereof are described later with reference to FIGS. 2 and 3.

Besides activating the CPU 7A, the operation unit 8 serves as an input device for conveying a user instruction such as tuning or the like to the CPU 7A by an operation input; the display unit 9 is constituted as a console for displaying information such as a receiving station and so on in a radio, while it is constituted by an LCD (Liquid Crystal Display Device) display device for displaying an image in a television set.

Note that the speed detector 10 is composed of a vehicle speed sensor externally connected and so on, and a vehicle speed signal detected by the speed detector 10 is supplied to the CPU 7A.

Figure 2:
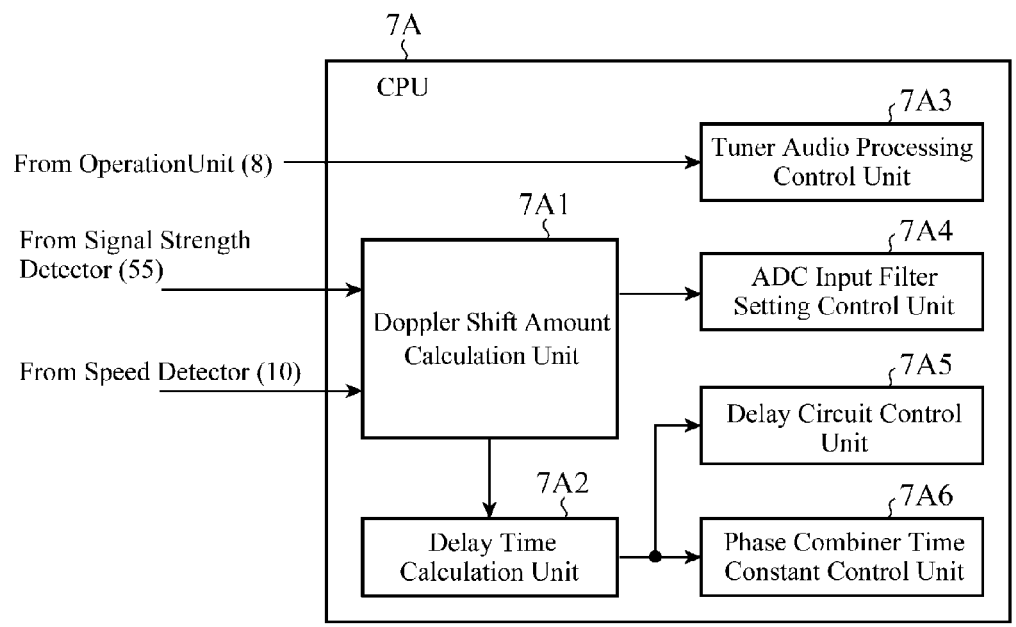
FIG. 2 is a block diagram in which an internal composition of a control unit of the mobile receiver apparatus according to Embodiment 1 in the invention is shown with developed functionally.

FIG. 2 is a block diagram in which the internal composition of the control unit of the mobile receiver apparatus 100A according to Embodiment 1 in the invention is shown with developed functionally.

As shown in FIG. 2, the CPU 7A includes a Doppler shift amount calculation unit 7A1, a delay time calculation unit 7A2, a tuner audio processing control unit 7A3, an ADC input filter setting control unit 7A4, a delay circuit control unit 7A5, and a phase combiner time constant control unit 7A6.

The Doppler shift amount calculation unit 7A1 has a function of acquiring the RSSI from the signal strength detector 55 incorporated in the DSP 5A, further acquiring an inter-vehicle movement speed from the externally connected speed detector 10, calculating a Doppler shift frequency which changes with the movement, and its sign and period by executing an arithmetic expression described later, and controlling the delay time calculation unit 7A2 and the ADC input filter setting control unit 7A4.

The delay time calculation unit 7A2 has a function of calculating a time required to move ¼ wavelength of a received frequency, and activating the delay circuit control unit 7A5 and the phase combination time constant control unit 7A6. The delay circuit control unit 7A5 has a function of setting to the delay circuit 4 the time required to move ¼ wavelength of the received frequency calculated in the delay time calculation unit 7A2, and the phase combiner time constant control unit 7A6 has a function of setting the delay time calculated in the delay time calculation unit 7A2 as a response time constant of the equiphase combiner 53 of the DSP 5A.

The tuner audio processing control unit 7A3 is activated by the operation input such as tuning by a user using the operation unit 8, and has a function of controlling the tuners A (2) and B (3), and the audio processing unit 56 in the DSP 5A.

The ADC input filter setting control unit 7A4 has a function of shifting a center frequency of an input filter by an amount corresponding to the Doppler shift frequency calculated in the Doppler shift amount calculation unit 7A1 in accordance with the sign.

Figure 3:
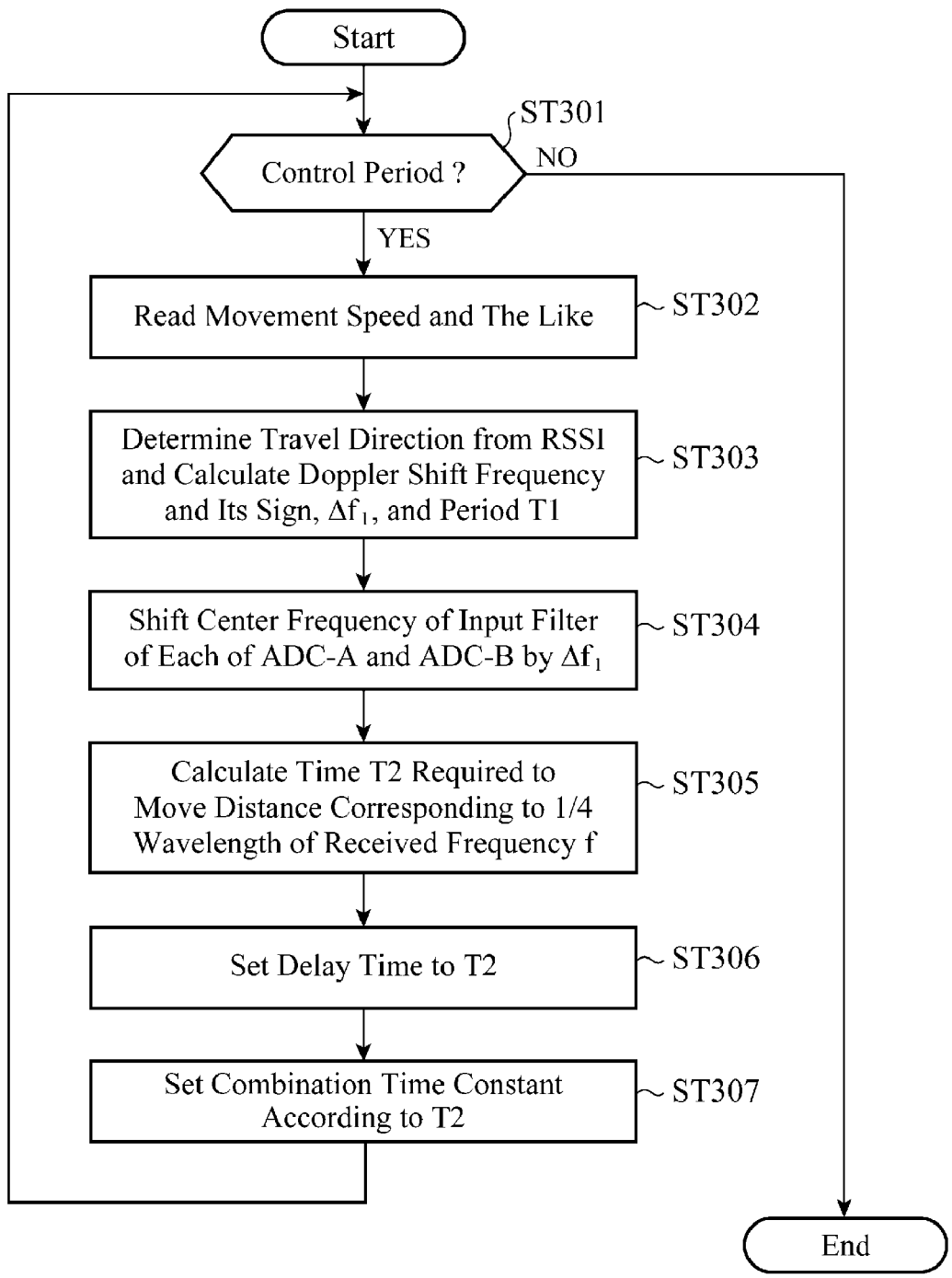
FIG. 3 is a flowchart showing operations of the mobile receiver apparatus according to Embodiment 1 in the invention.

FIG. 3 is a flowchart showing operations of the mobile receiver apparatus according to Embodiment 1 in the invention.

A detailed description is given hereinbelow of the operations of the mobile receiver apparatus 100A according to Embodiment 1 in the invention shown in FIGS. 1 and 2 with reference to the flowchart of FIG. 3.

First, the present mobile receiver apparatus 100A is activated by the user operation of the operation unit 8 and, when the mobile receiver apparatus 100A is activated, the CPU 7A reads, in accordance with a control period thereof ("YES" in Step ST301), the movement speed from the speed detector 10 and the RSSI from the signal strength detector 55 incorporated in the DSP 5A (Step ST302).

Subsequently, the CPU 7A (the Doppler shift amount calculation unit 7A1) examines their changes with time to determine whether a vehicle is moving toward or away from a transmission antenna of a base station including a broadcast station (not shown) by determining whether the RSSI is increasing or decreasing as time elapses, whereby the travel direction of the vehicle is determined. At the same time, by executing an arithmetic expression (1) shown below, a Doppler shift amount $\Delta f_1$ of a received frequency $f_0$ and a period T1 thereof are calculated (Step ST303).

$$\Delta f_1 = f_0 \frac{\sqrt{1-(v_0/c)^2}}{1-v/c \cdot \cos\theta} - f_0, T1 = 1/\Delta f_1 \quad (1)$$

wherein a sign c represents the speed of light ($3 \times 10^8$ [m/sec]); it is assumed that an angle $\theta=0$ is satisfied when the vehicle is moving toward the transmission antenna of the base station including the broadcast station, while the angle θ=180° is satisfied when the vehicle is moving away from the transmission antenna (Step 302).

Next, in order to correct the displacement of the Doppler shift, the CPU 7A (the ADC input filter setting control unit 7A4) shifts the center frequency of the input filter of each of the ADC-A (51) and the ADC-B (52) incorporated in the DSP 5A by the Doppler shift amount Δf1 with ± signs (Step ST304).

At this point, the CPU 7A (the delay time calculation unit 7A2) calculates a time T2 required for the movement from ⅛ wavelength to ¼ wavelength of the received frequency with the Doppler shift amount Δf1 to be outputted by the Doppler shift amount calculation unit 7A1 (Step ST305).

Then, the delay circuit control unit 7A5 sets in the delay circuit 4 the delay time T2 outputted from the delay time calculation unit 7A2 (Step ST306). In addition, the phase combiner time constant control unit 7A6 performs control in which a time constant indicative of response properties of the phase combination of the equiphase combiner 53 incorporated in the DSP 5A is set according to the delay time T2 (Step ST307).

After the setting of the delay time and the time constant described above, the processing flow returns to Step ST 301, and the above-described series of operations is repeatedly executed by the CPU 7A at every control period. Note that the control period may coincide with the sampling period of each of the ADC-A (51) and the ADC-B (52).

According to the above mobile receiver apparatus 100A of Embodiment 1 in the invention, the control unit (the CPU 7A) sets the delay time in correspondence to the received frequency and the Doppler shift frequency in the delay circuit 4, and the control unit (the DSP 5A) equiphase-combines signals having a phase difference of the order of ¼ wavelength (90°) therebetween, whereby it is possible to improve reception performance under a multipath situation in the reception of broadcast of a radio or a television set during the movement thereof.

In addition, when the control unit (the CPU 7A) calculates the period of the Doppler shift and adapts the period to the response speed of the equiphase combination, it is possible to extract sound which is natural in auditory sense after the detection.

Embodiment 2

Figure 4:
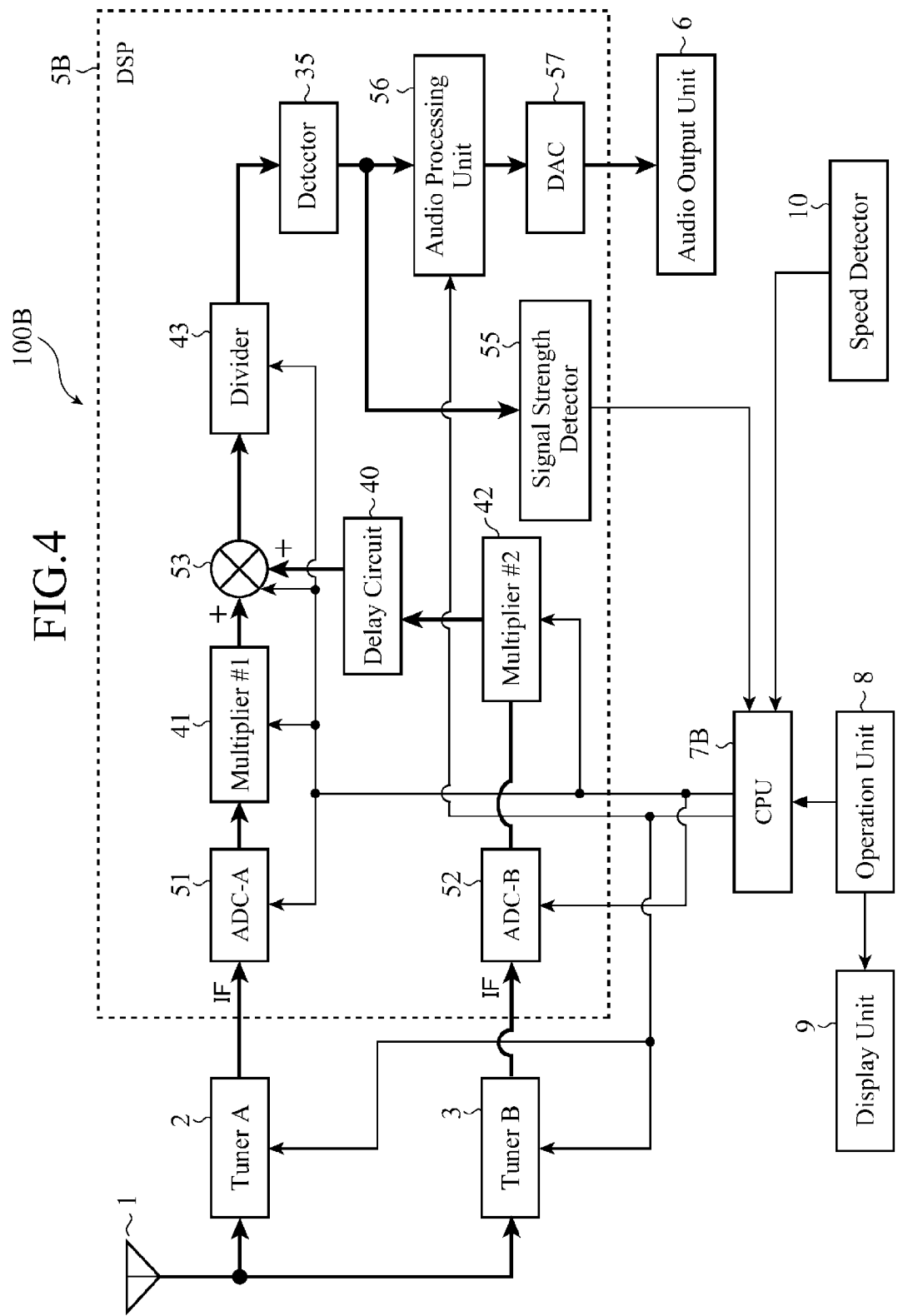
FIG. 4 is a block diagram showing an internal composition of a mobile receiver apparatus according to Embodiment 2 in the invention.

FIG. 4 is a block diagram showing an internal composition of a mobile receiver apparatus 100B according to Embodiment 2 in the invention.

The composition of Embodiment 2 is different from that of Embodiment 1 in that a delay circuit 40 is incorporated in a DSP 5B (Embodiment 1, the delay circuit 4 is externally disposed), an multiplier 41 for multiplying the IF signal output is inserted between the ADC-A (51) and the equiphase combiner 53, a multiplier 42 for multiplying the IF signal output is inserted between the ADC-B (52) and the delay circuit 40, and a divider 43 is inserted between the equiphase combiner 53 and a detector 35.

Hereupon, the DSP 5B operates in cooperation with a CPU 7B to thereby perform control in which an output obtained by multiplying the IF signal of the tuner A (2) in the multiplier 41, and a signal obtained by delaying an output obtained by multiplying the IF signal of the tuner B (3) in the multiplier 42 in the delay circuit 40 for setting, as the delay time, a time obtained by dividing a time required for the movement corresponding to a specific wavelength of the received frequency by a multiplication ratio in which a modulation band is securable are equiphase-combined in the equiphase combiner 53, and the resultant signal is outputted.

Figure 5:
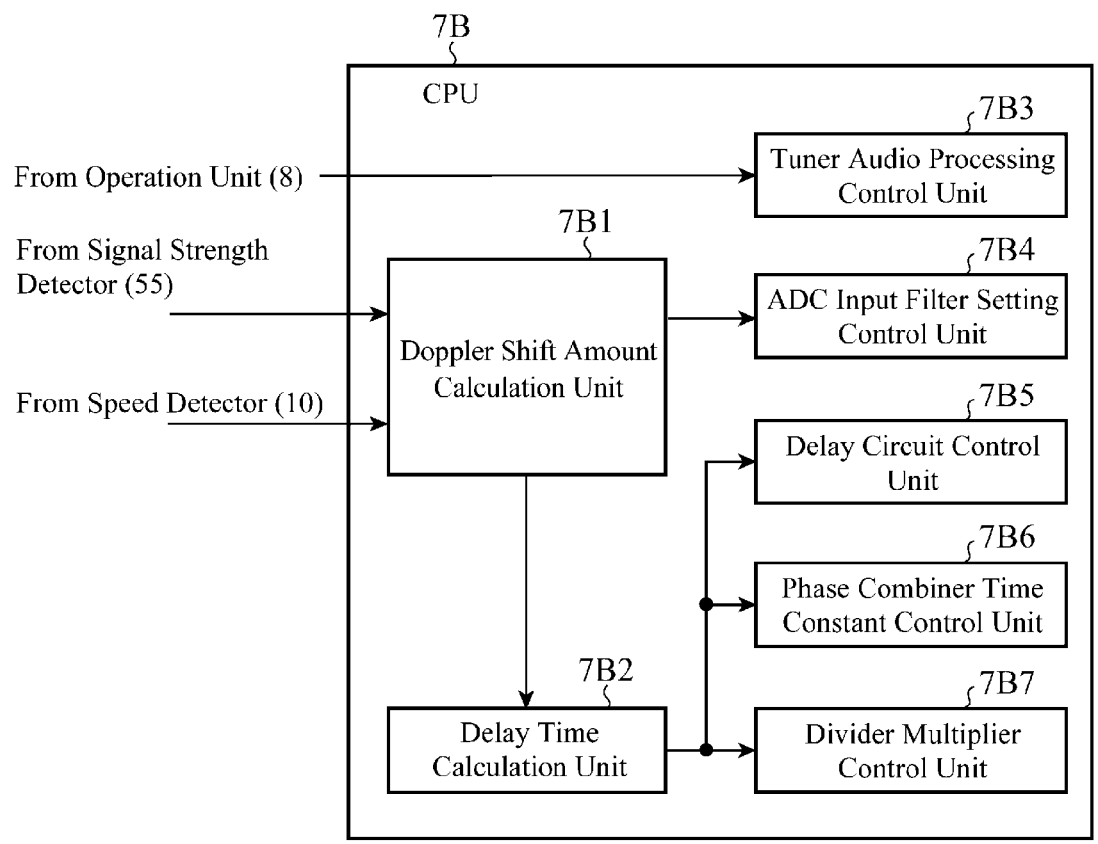
FIG. 5 is a block diagram in which an internal composition of a control unit of the mobile receiver apparatus according to Embodiment 2 in the invention is shown with developed functionally.

Consequently, the CPU 7B, as its internal composition is shown with developed functionally in FIG. 5, has a composition in which a divider multiplier control unit 7B7 is added to the composition of Embodiment 1 shown in FIG. 2. The detail of the divider multiplier control unit 7B7 is described later.

Figure 6:
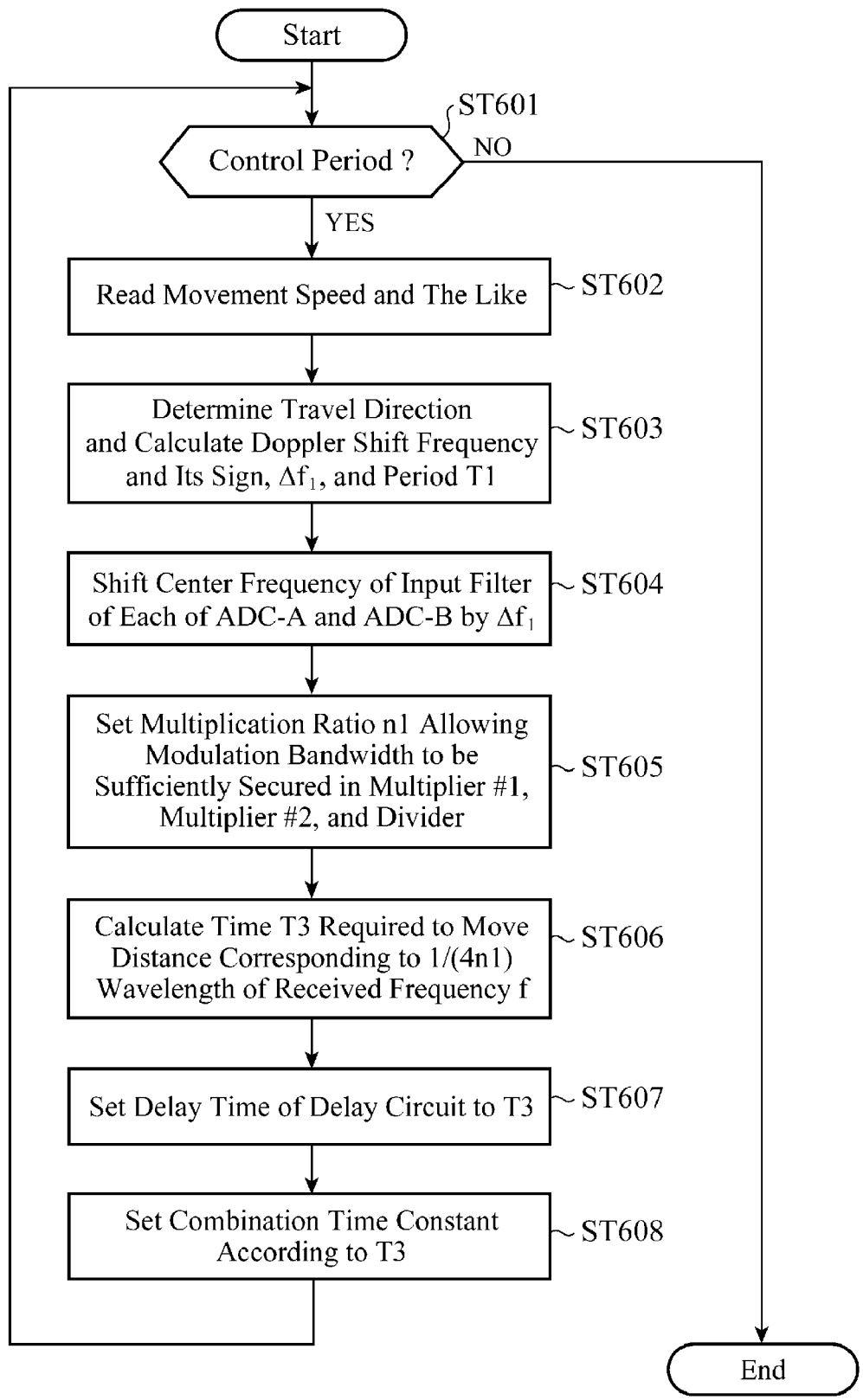
FIG. 6 is a flowchart showing operations of the mobile receiver apparatus according to Embodiment 2 in the invention.

FIG. 6 is a flowchart showing operations of the mobile receiver apparatus 100B according to Embodiment 2 in the invention.

A detailed description is given hereinbelow of the operations of the mobile receiver apparatus 100B according to Embodiment 2 in the invention shown in FIGS. 4 and 5 with reference to the flowchart of FIG. 6.

First, the present mobile receiver apparatus 100B is activated by the user operation of the operation unit 8 and, when the mobile receiver apparatus 100B is activated, the CPU 7B reads, in accordance with its control period ("YES" in Step ST601), the movement speed from the speed detector 10, and the RSSI from the signal strength detector 55 incorporated in the DSP 5B (Step ST602).

Subsequently, the CPU 7B (a Doppler shift amount calculation unit 7B1) examines their changes with time to determine whether the vehicle is moving toward or away from the transmission antenna of the base station including the broadcast station which is not shown by determining whether the RSSI is increasing or decreasing as time elapses, whereby the travel direction of the vehicle is determined. At the same time, by executing the arithmetic expression (1) described above, the Doppler shift amount Δf1 of the received frequency $f_0$ and its period T1 are calculated (Step ST603).

Next, in order to correct the displacement of the Doppler shift, the CPU 7B (an ADC input filter setting control unit 7B4) shifts the center frequency of the input filter of each of the ADC-A(51) and the ADC-B(52) incorporated in the DSP 5 by Δf1 with the ± signs (Step ST604).

At this point, the CPU 7B (the divider multiplier control unit 7B7) sets an optimum multiplication ratio n1 in which a modulation band can be sufficiently secured in each of the multiplier 41, the multiplier 42, and the divider 43 incorporated in the DSP 5B (Step ST605). Hereupon, a delay time calculation unit 7B2 calculates a time T3 required for the movement of 1/(8n1) wavelength to 1/(4n1) wavelength of the received frequency with the Doppler shift amount Δf1 (Step ST606), and sets the time T3 in the delay circuit 40 through a delay circuit control unit 7B5 (Step ST607). In addition, a phase combiner time constant control unit 7B6 performs control in which the time constant indicative of response properties of the phase combination of the equiphase combiner 53 incorporated in the DSP 5 is set according to the delay time T3 (Step ST608). The output of the equiphase combiner 53 is divided into the original IF frequency of 1/(n1) in the divider 43, and is detected.

After the setting of the delay time and the time constant described above, the processing flow returns to the processing in Step ST601, and the above-described series of operations is repeatedly executed by the CPU 7B at every control period.

According to the above-described mobile receiver apparatus 100B of Embodiment 2 in the invention, similarly to Embodiment 1, the control unit (the CPU 7B) sets the delay time in correspondence to the received frequency and the Doppler shift frequency in the delay circuit 40 incorporated in the DSP 5, and the control unit (the DSP 5B) equiphase-combines the signals having the phase difference of the order of ¼ wavelength (90°) therebetween; thus, it is possible to improve the reception performance under the multipath situation in the reception of broadcast of a radio or a television set during the movement thereof. In addition, the period of the Doppler shift is calculated and adapted to the response speed of the equiphase combination; thus, it is possible to extract sound which is natural in auditory sense after the detection.

Further, when the delay circuit 40 is incorporated in the DSP 5B and the multipliers 41 and 42 are caused to perform multiplication by a factor of n1, the phase rotation of the IF signal output with respect to the same delay time is multiplied by a factor of n1. Therefore, when the delay of the time T3 is executed in the delay circuit 40, the delay corresponds to the delay time of T3×n1 in an antenna stage. Hereupon, when the time required to move a distance of ⅛ to ¼ wavelength of the received frequency is assumed to be T2 in Embodiment 1, T2 is given by T2=n1·T3 in Embodiment 2; consequently, the delay time T3 is 1/n1 times the delay time T2 to thus reduce the burden of a delay device. Since the phase difference in an RF stage is the same as the phase difference in an IF stage, and the phase difference is multiplied by a factor of n1; thus, when the value of n1 is set to a large value, it is theoretically possible to input two IF signals which are multiplied by a factor of n1 and also have the phase difference of 90° therebetween to the equiphase combiner 53 to achieve the diversity effect, no matter how slow the speed of the mobile unit is.

Note that in the above Embodiments 1 and 2, although only the mobile receiver apparatus 100A (B) having two systems of the tuners A (2) and B (3) has been shown by way of example, it is also possible to achieve the equiphase combination of three or more tuners by further adding thereto the delay circuit 4 and the tuner.

In addition, in the above Embodiments 1 and 2, the description has been given on the assumption that the DSP 5A (5B) and the CPU 7A (7B) operate in cooperation with each other to thereby implement the functions as "the control units for dynamically setting the delay time in the delay circuit in accordance with the measured movement speed of the mobile unit and the received electric field strength at the time of the measurement, and also equiphase-combining the intermediate frequency signals generated by the first and second tuners and outputting the resultant signal. However, the functions can be implemented by establishing a function sharing system in which, for example, the DSP 5A (5B) takes the load including the Doppler shift amount calculation and the delay time calculation, or all of the functions can be implemented by the DSP 5A (5B) alone or the CPU 7A (7B) alone.

Note that all of the functions of the control units shown in FIGS. 2 and 5 may be implemented by software, or at least part of the functions may be implemented by hardware.

For example, the data processing in which the delay time is dynamically set in the delay circuit in accordance with the measured movement speed of the mobile unit and the received electric field strength at the time of the measurement, and the intermediate frequency signals generated by the first and second tuners are equiphase-combined and the resultant signal is outputted may be implemented on a computer with one or a plurality of programs, or at least part of the data processing may be implemented by hardware.

INDUSTRIAL APPLICABILITY

As described above, in order to achieve an improvement in dynamic reception performance at low cost, since the mobile receiver apparatus 100A (100B) according to the present invention is configured such that the received frequency signal via the delay circuit 4 (40) and the undelayed received frequency signal are individually inputted to the first tuner 2 and the second tuner 3 and the control units (the DSP 5A (5B) and the CPU 7A (7B)) equiphase-combine the intermediate frequency signals obtained by the conversion in the individual tuners, the combined intermediate frequency signal output can be optimized when the broadcast wave inputted to the antenna 1 momentarily changes, and the mobile receiver apparatus 100A (100B) can be applied to not only a radio or a television set mounted on a vehicle but also a mobile communication apparatus mounted on a airplane or the like which moves at high speed.

The invention claimed is:

1. A mobile receiver apparatus mounted on a mobile unit, comprising:
   a first tuner for converting a received frequency signal received by an antenna into an intermediate frequency signal;
   a delay circuit for delaying the received frequency signal by a time required for the movement of the mobile unit corresponding to a specific wavelength of the received frequency signal;
   a second tuner for converting an output of the delay circuit into a second intermediate frequency signal; and
   a control unit for dynamically setting the delay time in the delay circuit in response to a movement speed of the mobile unit to be measured and a received electric field strength at the time of the measurement, and also equiphase-combining the intermediate frequency signals generated by the first and second tuners and outputting the resultant signal.

2. The mobile receiver apparatus according to claim 1, wherein the control unit reads the movement speed to determine a travel direction of the mobile unit from the received electric field strength at the time of the reading, calculates a Doppler shift frequency which changes with movement of the mobile unit and a sign and a period thereof, shifts a center frequency of an input filter constituting each of analog-digital converters for converting an output of the first tuner and an output of the second tuner into digital signals by an amount corresponding to the calculated Doppler shift frequency in accordance with the sign, calculates a time required for the mobile unit to move ¼ wavelength of the received frequency to set the time in the delay circuit, and sets a time constant in the equiphase combination to a value identical with that of the time.

3. A mobile receiver apparatus mounted on a mobile unit, comprising:
   a first tuner for converting a received frequency signal received by an antenna into a first intermediate frequency signal;
   a first multiplier for multiplying the first intermediate frequency signal in a range in which a modulation band is securable;
   a second tuner for converting a received frequency signal received by an antenna into a second intermediate frequency signal;
   a second multiplier for multiplying the second intermediate frequency signal in a range in which a modulation band is securable:
   a delay circuit for setting, as a delay time, a time obtained by dividing a time required for the movement of the mobile unit corresponding to a specific wavelength of the received frequency by a multiplication ratio in which a modulation band is securable, based on the output of the second multiplier;
   a control unit for equiphase-combining the signal delayed by the delay circuit and the output of the first multiplier, and outputting the resultant signal.

4. The mobile receiver apparatus according to claim 3, wherein the control unit reads the movement speed to determine a travel direction of the mobile unit from the received electric field strength at the time of the reading, calculates a Doppler shift frequency which changes with movement of the mobile unit and a sign and a period thereof, shifts a center frequency of an input filter constituting each of analog-digital converters for converting an output of the first tuner and an output of the second tuner into digital signals by an amount corresponding to the calculated Doppler shift frequency in accordance with the sign, sets the multiplication ratio and calculates a time required for the movement of the mobile unit corresponding to ¼ wavelength of the received frequency to set the time in the delay circuit, and sets a time constant in the equiphase combination to a value identical with that of the time.

* * * * *